United States Patent [19]

Shi et al.

[11] Patent Number: 4,946,814

[45] Date of Patent: Aug. 7, 1990

[54] PROCESS FOR IMPROVING THE PHYSICAL AND CATALYTIC PROPERTIES OF FLUID CRACKING CATALYSTS

[75] Inventors: Joseph C. S. Shi, Bartow, Ga.; Edwin W. Albers, Annapolis; Geoffrey R. Wilson, Timonium, both of Md.

[73] Assignee: Thiele-Kaolin Company, Sandersville, Ga.

[21] Appl No.: 321,355

[22] Filed: Mar. 10, 1989

[51] Int. Cl.$^5$ .............................................. B01J 31/00
[52] U.S. Cl. ....................................................... 502/62
[58] Field of Search ............................................ 502/62

[56] References Cited

U.S. PATENT DOCUMENTS

| 3,219,590 | 11/1965 | Ribaud | 502/62 |
| 3,657,151 | 4/1972 | Noble | 502/62 |

FOREIGN PATENT DOCUMENTS

| 34016 | 2/1982 | Japan | 502/62 |
| 61615 | 4/1982 | Japan | 502/62 |
| 2153116 | 7/1987 | Japan | 502/62 |

Primary Examiner—Carl F. Dees
Attorney, Agent, or Firm—Joseph P. Nigon

[57] ABSTRACT

A process for significantly improving the physical and catalytic properties of faujasite containing fluid cracking catalysts (FCC) employing a sol binder by incorporating acid stable surfactants into the catalyst component streams prior to spray drying.

12 Claims, 2 Drawing Sheets

PROCESS FOR IMPROVING THE PHYSICAL AND CATALYTIC PROPERTIES OF FLUID CRACKING CATALYSTS

BACKGROUND OF THE INVENTION

1. Field of the invention

This invention relates to a process for preparing fluid cracking catalysts (FCC) and more particularly sol based faujasite containing catalysts by adding acid stable surfactants to the component streams prior to the spray drying step. This addition results in a catalyst that has superior density and hardness characteristics.

Although the surfactants may be added into any of the component streams, the greatest improvement in properties of the catalyst are achieved when the surfactants are added to all component streams prior to spray drying.

2. Description of the Prior Art

Molecular sieve-type cracking catalysts have been in use since 1962, when Plank and Rosinski (U.S. Pat. Nos. 3,140,249; 3,140,253; 3,210,267; 3,271,418; 3,436,357; 3,459,680) first introduced them. The rapid acceptance by the petroleum refining industry, world-wide, was due in large part to the significant increase in gasoline yield and improved coke selectivity obtained with zeolite containing catalysts as compared to catalysts based upon amorphous silica-alumina.

The first catalysts introduced were based upon the incorporation of rare earth stabilized faujasite with silica-alumina ratio's between 2.5 and 3.0. These early formulations were simply admixtures of zeolite-molecular sieves with the amorphous silica-alumina and clay-synthetic gel materials previously used alone as cracking catalysts. That is, prior to spray drying, the molecular sieve component was added typically to the gel slurry. The rapid initial success of these types of catalysts and the potential they afforded for yield and operational benefits resulted in the petroleum refining industry demanding FCC catalysts containing molecular sieves with even higher silica-alumina ratios; i.e. molecular sieves approaching silica-alumina ratio of 5; because this ratio material imparts superior thermal and hydrothermal stabilities. This demand was further stimulated by the high temperature regeneration technology introduced in the mid- seventies and described in U.S. Pat. No. 3,844,973, and the almost simultaneous development of combustion promoter additives for regeneration of FCC catalyst described in U.S. Pat. No. 4,072,600.

Acceptance of these technologies by the refining industry demanded catalyst with molecular sieves of higher silica-alumina (faujasite type) ratio with higher maintenance of cracking activity (stability) due to the more severe operating conditions to which the catalyst was subjected.

Presently, the removal of lead from gasoline has further sustained the world-wide demand for high silica-alumina ratio sieves. This is due to the improvement in gasoline octane which can be obtained catalytically by converting high silica-alumina ratio molecular sieves into a modified form known as ultrastable-Y or USY type materials. The ultrastable form of Y-zeolite can be achieved by conversion of the sodium form of Y-zeolite (faujasite) before incorporation into the catalyst or the entire catalyst particle can be treated, under conditions which result in an in-situ conversion of faujasite within the microsphere itself. It had been observed that the higher the silica-alumina ratio of the starting NaY zeolite, the higher the quality and performance of USY prepared either ex-situ or insitu. The same phenomenon is noted in the molecular seives sold under the trade name LZ 210 type molecular sieves by Union Carbide Corp.

The use of a silica-sol type binding system in the preparation of zeolite promoted catalysts has been described in U.S. Pat. No. 3,867,308 and alum buffered silica-sol have been described U.S. Pat. No. 3,957,689.

Catalysts based on sol technology for the binding system were developed in response to an increasing demand for harder and denser catalysts to meet the ever tightening environmental constraints being placed on the petroleum refining industry. There are a number of other related patents describing processes for preparing molecular sieve type catalyst; e.g. U.S. Pat. No. 3,425,956. These patents are typical of the large body of art in this area.

With the introduction of sol bond catalysts, significant improvements in density and hardness were immediately apparent. These new catalysts, however, still left considerable room for additional improvement. Namely examination by Scanning Electron Microscopy (SEM) revealed that almost every microspheriodal FCC catalyst particle possesed a "blow-hole" or a cavernous region which made them much more susceptible to break into two or more smaller fragments during the FCC operation. When this occurs the smaller fragments are almost instantly lost via the regenerator flue gas stack. If the breakage occurs on the reactor side, the slurry oil stream becomes over-loaded with catalyst dust referred to as fines. If the condition continues for any appreciable length of time it can result in the total shut down of the FCC unit. Such a shut down is extremely costly to the refinery both in terms of lost product and unscheduled maintenance. The "blow-holes" can be reduced by changes in the catalyst manufacturing process. These process changes are not necessarily easy or always economical. Even after the conventional process scheme changes the "blow-hole" problem is not necessarily eliminated.

It is the purpose, therefore, of our invention to show that the "blow-hole phenomenon" (cavernous openings and the shell character of micropheriodal particles) can be effectively eliminated by the selective use of acid stable surfactants.

This treatment does not negatively affect the catalytic activity and selectivity. It might be argued that the improved morphology improves the reactivity of the catalyst.

BRIEF DESCRIPTION OF THE DRAWINGS

FIGS. IA and IB are photo-lithographs showing typical morphology for silica-alumina sol type of binder systems.

FIGS. IIA and IIB are photo-lithographs showing the effect of particle morphology when specific fluorohydrocarbon surfactants are added to the clay slurry.

Figure 3A:
Figure 3B:
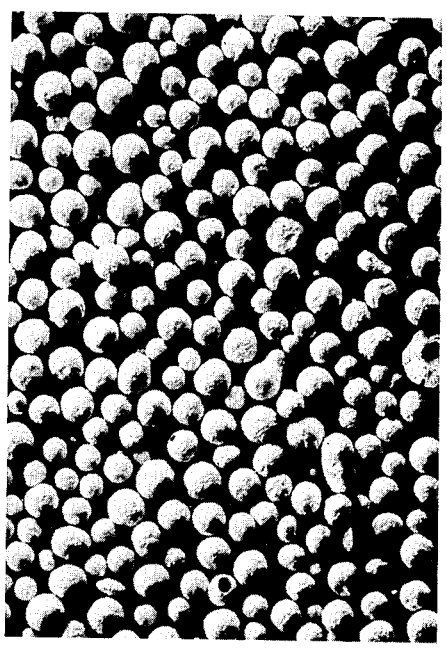
Figure 4A:
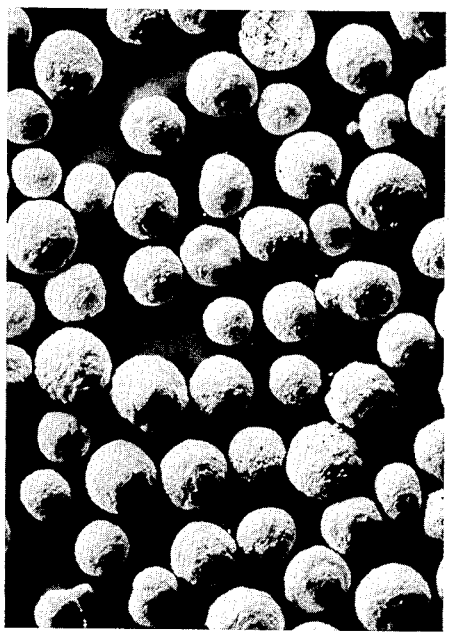
Figure 4B:
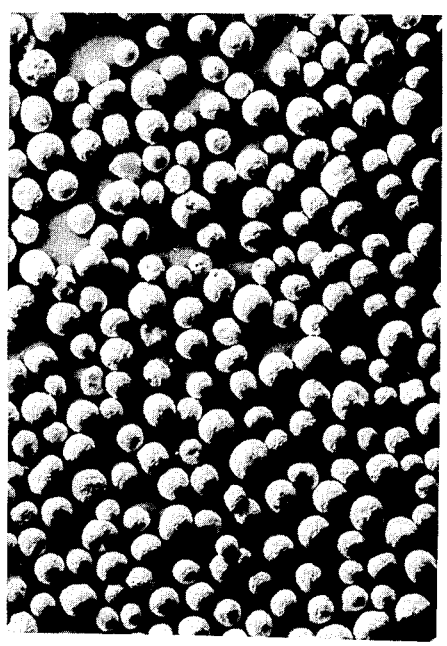

FIGS. IIIA and IIIB are photo-lithographs of the product recovered in Run 170 of Table V.

FIGS. IVA and IVB are photo-lithographs of the results described in Run 171 of Table V.

DETAILED DESCRIPTION OF THE DRAWINGS

In FIGS. I through IV the scanning electron microscope (SEM) photo-lithographs at different magnifications (scale is given on each figure), for fluid cracking catalysts (FCC) with and without the acid stable surfactants, are presented. Examples with specific fluorohydrocarbon surfactants are included. All these examples were formulated with 25% sodium zeolite in the Y form, 23% silica, 10% alumina and 42% clay using a silica-sol type binder system.

FIGS. IA and IB represent typical morphology for this type of binder system. That is, the overwhelming majority of particles with "blow holes" and in some instances the thin shell character is easily discernible. This particular sample had a CAI of 12.13 and a Attrition Rate of 2.3. (See section on Attrition Test Procedure).

FIGS. IIA and IIB depict the effect on particle morphology when specific acid stable fluorohydrocarbon surfactants are added to the clay slurry. The loading here is 1 gram of the specific fluorohydrocarbon surfactant, designated FC-95 by the 3M Company and described as potassium perfluoroalkyl sulfonates, per 2442 grams of as is clay. Examination of the photo-lithographs show the almost complete elimination of "blow-holes". Moreover, broken remanents indicate in general a more homogeneous solid particle. The attrition data for this sample are: CAI of 2.39 and Attrition Rate of 0.48.

comparable results are obtained for Zonyl TBS; e.g., at equivalent surfactant loading, the two surfactants give similar morphological behavior. That is, a few "blow-holes" in both samples, but Zonyl TBS results in a more homogenous particle as is evident from the smaller size of the openings and possibly a thicker shell. FIGS. IIIA and IIIB (Run 170 Table V) is indicative of the behavior with this surfactant.

In FIGS. IVA and IVB the loading of Zonyl TBS has been increased to 2 grams per 2442 grams of clay (run 171, Table V) and the photographs show almost complete elimination of "blow-holes" and correspondingly no thin shell formation. The attrition data for this sample are: CAI of 1.32 and Attrition Rate of 0.26.

BRIEF DESCRIPTION OF THE INVENTION

Using the silica-sol binder system buffered with acidified alum as described in U.S. Pat. No. 3,957,689, we have been able to prepare a number of typical FCC catalysts with significantly improved morphology, selectivity and attrition resistance through the addition of acid stable surfactants into individual component streams, either singly, or in combinations thereof as compared to catalysts prepared in an identical fashion to the teaching of the cited patent, but without the surfactant.

In a typical preparation of silica sol binder, the silica hydrosol contains nominally 12% solids consisting of 10% silica and 2% alumina from the acidified alum used for buffering the sol.

The essential feature of the invention is the addition of the acid stable surfactants. Any acid stable surfactant will give satisfactory results. The preferred surfactants are the fluorohydrocarban surfactants.

In most applications, the preferred surface active agents are effective in very low concentrations (50 to 1000 parts per million or 0.005 to 0.1%), making them extremely cost effective. Typically the chemical structure can be represented as $R_f CH_2 CH_2 SO_3(x)$ where $R_f = F(CF_2-CF_2)$ 3-8 and X can be either H or NH4.

Figure 1A:
Figure 1B:
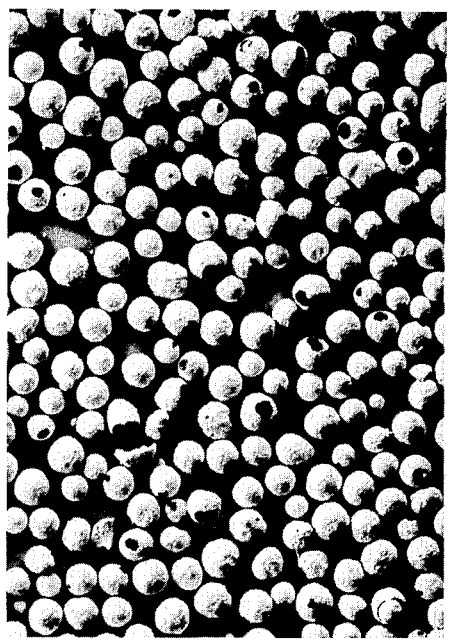
Figure 2A:
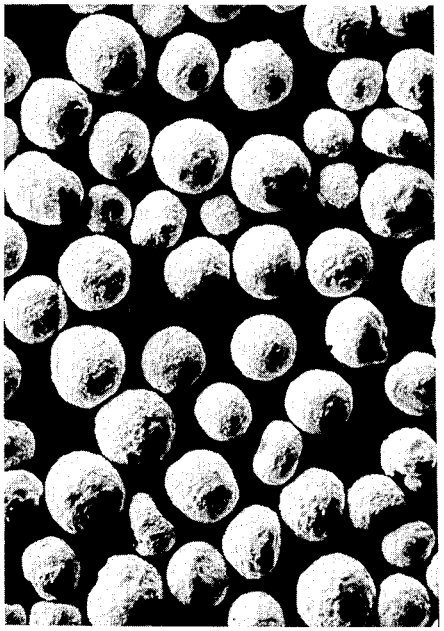
Figure 2B:
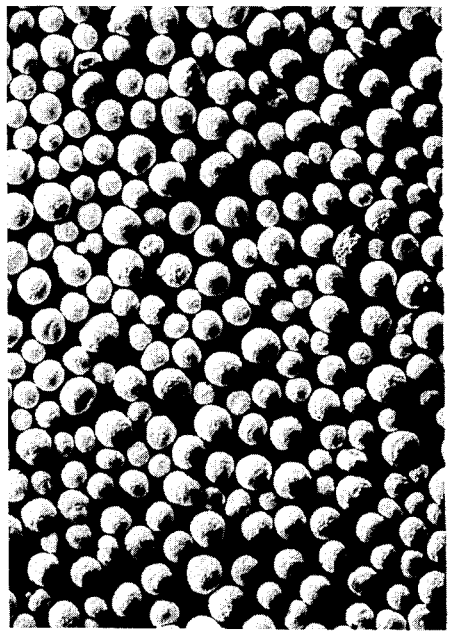

The surfactant can be added to all component streams before final slurring and spray drying. The addition to a single component of the catalyst formulation, however, at a nominal loading of about one pound per 2.5 tons of finished catalyst gives improved attrition resistance and catalytic selectivity compared to catalysts prepared by the prior art processes. A further improvement of our invention is the almost complete elimination of "blowholes". This improvement is apparent from the photolithographs FIGS. 1A through IVB, and microtome analysis indicates improved dispersion of individual component particles comprising the microspheres themselves.

SUMMARY OF THE INVENTION

The addition of acid stable surfactants and in particular anionic fluorohydrocarbon types significantly improves the physical and catalytic properties of FCC type catalysts employing a sol binder. That is, the catalysts so prepared from the incorporation of these types of surfactants have dramatically improved particle morphology (virtual elimination of "blow-holes" with attendant improvement in catalyst hardness-attrition resistance). Moreover, the improved distribution of the various component materials (e.g. molecular sieves, clay and alumina comprising the microspheroidal catalyst particles result in improved activity and selectivity for the catalyst so prepared when compared with identical formulation made under identical conditions but without the addition or incorporation of any of these surfactants.

We have found anionic surfactants to be most effective in acid-sol type systems, but combinations of anionic and cationic species for specific components may prove to be effective also. Typically the usage has been normalized against the clay level at approximately one pound per ton of clay in a given formulation. Higher loading than this can be used and may be required to impart maximum benefit in the catalytic and selectivity properties for a given system.

The exact mechanism by which these surfactants operate in these systems is not clear at this time. From published data (Iler, Ralph K., "The Colloidal Chemistry of Silica and Silicates" Connell University Press, Ithica N.Y. (1955)) on silica-sols and in the pH range of 3.0 to 5 the charge on sol particles is believed to be neutral to slightly negative at the higher pH and to be very unstable; i.e. tending to gel instantly in the pH range 4 to 7. It may be argued that an anionic surfactant immediately changes the charge on silica sol micelles to strongly negative, thereby rendering the sol extremely stable toward gelling (polymerization). This has the same effect as raising the pH into a strongly alkaline region, wherein silica-sols are known to be very stable. Maximum attrition resistance benefit occurs, however, when all component streams are so treated before combining into a single slurry for spray drying. We have also found that simply adding the surfactant to the spray dryer feed tank, after all components have been added, also results in improved attrition resistance.

ATTRITION TEST PROCEDURE

The attrition test is similar to that described in U.S. Pat. No. 4,010,116. The procedure for the measurement is as follows:

1. A sample of catalyst is calcined in a muffle furnace at 1000 degrees F, for 1 hour.
2. 45.0 gm of calcined catalyst is mixed with 5 gm of water in a capped container and shaken to humidify the catalyst. The sample is then allowed to cool (approximately 15 min.)
3. The humidified catalyst is charged to the attrition tube with a low air flow rate already established (about 1.5 liters/min).
4. The test air flow rate of 9 liters/min is established.
5. After 1 hour, the fines collection thimble is quickly replaced by a fresh one and the weight of fines collected is determined.
6. Step 5 is repeated at hourly intervals for a desired period. We are currently using 3 hours and extrapolating to the normally quoted 5 hours value.
7. The hourly data is either plotted or entered into a computer program to give three attrition parameters discussed below.

The results are expressed in terms of the following parameters:

ATTRITION INDEX (AI) at 5 hours

This value is the total amount of fines expressed as a weight %, collected in the fines collection thimble after exactly 5.0 hours. (Collection of data at a time not corresponding to exactly hourly intervals is corrected either graphically or by linear regression fitting). This parameter is an indicator of short term catalyst loss in the commercial operation. Hard catalyst is considered to have an AI of 7 or lower. Values of 12 and lower are commercially acceptable.

ATTRITION RATE

This index is the rate of fines generated between 1 and 5 hours expressed as weight % per hour. This parameter is an indicator of the longer term loss of catalyst in the commercial FCC unit resulting from attrition. Generally, values of 1.0 and less are desired.

INITIAL FINES (Intercept)

This is the amount of fines generated at time zero in the test. This parameter is an indication of the amount of fines (0 to about 20 microns) present in the original spray dried catalyst. As such, it is an indicator of the amount of fines which will be lost immediately from he commercial unit when fresh catalyst addition is made.

CORRECTED ATTRITION INDEX (CAI)

This is the Attrition Index minus the Initial Fines. This represents a correction for the amount of 0-20 micron material in the original sample as charged to the test.

DETAILED DESCRIPTION OF THE INVENTION

The first step of the process is the preparation of the aluminum sulfate (alum) silica sol component. In this step of the process about 0.4 to 0.46 kilograms of alum is dissolved in 1.7 to 1.8 kilograms of water in a suitable reactor. A quantity, about 0.28 to 0.29 kilograms of concentrated sulfuric acid is added to the solution, the solution is allowed to cool to room temperature and a quantity of sodium silicate, containing about 12.4 weight percent silicone dioxide is added with constant stirring. The silicate addition is adjusted to achieve a pH of about 2.8 to 3.05 in the resulting slurry.

The clay slurry is prepared in the second step of the process. A sufficient quantity of kaolin clay is added to a quantity of water to prepare a slurry containing about 70% solids. The clay is dispersed by adding a dispersant such as tetrasodium pyrophosphate in admixture with sodium polyacrylate.

The zeolite slurry is prepared in the third step of the process. A sufficient quantity of faujasite is added to a quantity of water to prepare a slurry containing about 30 percent solids. The pH of the slurry is adjusted to about 4.5 to 4.8 with a 20 percent solution of sulfuric acid. Any faujasite having a silica to alumina ratio of about 5 can be used. The faujasite sold under the trade name PQ Valfor CP 300-63 gives satisfactory results.

An alumina slurry is then prepared by adding dry alumina powder to a sufficient quantity of water to prepare a slurry containing about 20 to 25 weight percent solids. The alumina slurry is added to the outer ingredients already in the mixing tank to prepare the final spray dryer slurry.

The essence of the invention resides in the addition of the surfactant to any one of the component slurries. The addition is preferably made in this step, but the surfactant can be added to any one or more of the component slurries individually or after all components have been combined. The surfactant is preferably pre-diluted and added as 1 percent by weight solution.

The final step in the preparation is the spray drying step. Spray drying is a well known and well established drying technique for drying slurries. In this step the slurry prepared in steps described above is fed to a conventional spray dryer. Feeding the slurry to a spray dryer employing a spinning wheel atomizer operated at an atomizer wheel speed of 10,000 rpm is preferred. The spray dryer is preferably operated at an inlet temperature of about 500 degrees Fahrenheit and an outlet temperature of about 250 degrees Fahrenheit.

Following spray drying and before any physicohemical tests can be conducted on the catalyst, the sodium associated with the zeolite and the occluded salts resulting from the addition of the binder must be removed. One technique to effect this removal is pre-exchange of the zeolite. In another technique low sodium content binders such as silica sol, silica—alumina sol or alumina sol are used to avoid washing and/or exhcanging with ammonium salts or rare earth salt solutions. However, in the typical commercial operation washing, exchanging and often intermediate calcination at 1000 to 1100 degrees F. are required to adequately reduce the sodium to levels that do not impair the function of a given catalyst formulation.

The following general technique was used in the Examples I through IV set out below:

1. A quantity of the spray dried material (260-270) grams were slurried in 800 to 1000 ml. of water heated to 140 to 160 degrees F.
2. The slurry was dewatered in a Buchner funnel.
3. A solution of ammonium sulfate was prepared by dissolving about 140 to 160 grams of ammonium sulfate in 1300 to 1600 grams of water. The filter cake was rinsed with about 1600 gms. of this solution that had been heated to 140 to 160 degrees F.
4. The filter cake was then rinsed with 100 to 1400 ml. of water that been heated to 140 to 160 degrees F.
5. The filter cake was reslurried and the pH of the resulting slurry was recorded.
6. A rare earth exchange was completed by adding a solution of rare earth chloride hexahydrate containing 2 grams of the hexahydrate per 100 grams of finished catalyst. The finished catalyst contained 1 per cent rare earth oxide. The pH was adjusted to a pH of 4.7 to 5.0 and was maintained at that value for about 10 minutes.

7. The slurry was dewatered in a Buchner and rinsed with about 1200 ml. of water heated to 140 to 160 degrees F.

8. The filter cake was dried at 450 degrees F. followed by calcination of the dry powder at 1000 degrees F. for one hour.

After drying, the finished catalyst was properly prepared for subsequent testing.

9. Steps 1 through 4 were repeated. The product was washed with 1800 ml of water heated to 140 to 160 degrees. F.

10. The filter cake was dried for 4 hours at a temperature of 450 degrees F. and the catalyst product recovered.

The process described above is used to prepare a faujasite containing rare earth containing catalyst. The novel process can also be used to prepare amorphous gel based catalysts.

If a catalyst devoid of rare earth is to be prepared the rare earth exchange step is eliminated. The calcination temperature in step 8 can be carried out at temperature between 1000 and 1500 degrees F depending on the type of hydrogen Y catalyst being prepared.

The invention is illustrated by the following specific but non-limiting examples.

EXAMPLE I

This example illustrates the preparation of the catalyst without the addition of acid stable surfactant.

Preparation of Acid/Alum Silica Sol Binder

An acid/alum solution was prepared by mixing the following components in the ratios shown to the volume needed. A quantity (0.454 kg) of aluminum sulfate was mixed well with 1.79 kg of water. The mixture was agitated well until all the aluminum sulfate has been dissolved. After the sulfate had been dissolved 0.029 kg of 95–98% sulfuric acid was added. This solution is then cooled to at least 86 degrees F before it was used. The acidified alum solution was pumped into a high shear mix pump and simultaneously a stream of sodium silicate, containing 12.4 wt% silica, was also pumped into the mix pump. The silicate flow rate is adjusted to achieve a pH in the mixing pump discharge in the range of 2.80–3.05. A 3:1 flow of silicate to acidified alum was typically required to achieve the desired pH range.

Clay Slurry

A slurry of Kaolin clay was made up to a 70% solids slurry, measured by O'Haus moisture balance, using as dispersing agents TSPP and sodium polyacrylate (NaPa) slurry make-up water in the following proportions, 0.24% TSPP predissolved in hot water to a 10% solution, and 0.25% NaPa, based on the weight of as is air float clay. The dispersant is first added to the make-up water followed by the dry clay which is added under high shear agitation 1. The binder solution was prepared consisting of Acid/alum and sodium silicate as described above.

2. The required amount of the binder was transferred to a mix tank under a high shear mixer. The temperature and pH of the mix was recorded.

3. The required amount of clay slurry, prepared as described above was added to the high shear mix tank. The temperature and pH of the mix was recorded.

4. A zeolite slurry was prepared by slurring dry zeolite powder in water to 30% solids and the pH of the slurry was adjusted to 4.5–4.8 using 20% sulfuric acid. This slurry was then added to the high shear mix tank. The temperature and pH was recorded. We have found PQ Valfor CP 300-63 dry zeolite powder to be suitable.

5. An Alumina slurry was prepared by slurring dry alumina powder in water. This may conveniently be in the amunt of water required to adjust the drier feed slurry to its desired water and solids content. Normally a calculated 22 wt % solids was employed. This alumina slurry was added to the other catalyst ingredients already in the mix tank under high shear agitation to produce the final spray drier feed slurry. The temperature and pH were recorded. Any suitable alumina powder may be used. For the purpose of this invention Alcoa Alumina Powder CP-2 was used.

6. The spray drier feed was pumped to a Anhydro Model Type III-A No. 4 spray drier employing a spinning wheel atomizer. Operating conditions were, 500 degrees F inlet temperature, 250 degrees F. outlet temperature, atomizer wheel speed 10,000 rpm.

Table I indicates typical results obtained when catalysts were prepared by the prior art procedure. Catalyst hardness as expressed by the CAI index were in excess of 6 wt %/hr and the attrition in excess of 1.3 wt %/hr on a rate basis.

EXAMPLE II

Catalyst Preparations Employing Dupont Zonyl TBS Surfactant

The procedure of Example I was followed except that the desired amount of additive in the form of a 1 gm/100 ml prediluted solution was added to the weighed amount of the desired component slurry.

Table II and IV present the data obtained using the procedure of our invention wherein the acid stable dispersant was Dupont Zonyl TBS. Catalysts were prepared with a range of zeolite contents from 10 to 25% at 18% binder expressed as silica. The attrition indexes are considerably lower (Table II) than those of the prior catalysts of Example I. All catalysts of our invention had a CAI value of less than 5.00 and an attrition rate of less than 1.00.

Table V indicates the effect of varying the Zonyl from 1 to 4 grams per 2442 gm of as is clay. The data again indicates substantial improvement over the prior art catalysts of Example I. No further improvement appears to be observed when the surfactant level is raised to 2 gms to 4 grams per 2442 gm of as is clay.

EXAMPLE III

Catalyst Preparation Employing 3M FC-95 Surfactant

Catalysts were prepared by the procedure of Example II using an acid stable surfactant described as potassium perfluoroalkyl sulfonates produced by 3M designated FC-95. The attrition data on these catalysts is presented in Table III. When compared to a catalyst prepared by the prior art procedure catalysts prepared with the acid stable surfactant all had a substantially improved attrition over a range of surfactant from 1 to 4 gm per 2442 gm of as is clay.

EXAMPLE IV

Addition of Surfactant to other Components of the Catalyst

Test were performed to determine the effects of adding acid stable surfactant to the other components of the catalyst slurry. Table VI and Table VII demonstrates theat the surfactant is effective when added to any of the catalyst components individually (Runs 181, 182 and 183) to the spray dryer feed (Run 184) or all components (Runs 178 and 179.). Again the improvement is substantial when compared to catalysts prepared by the processes of the prior art.

EXAMPLE VI

Preparation of Spray Dried Air Float Koalin Employing 3M FC-95 Potassium Perfluoralkyl Sulfonates Surfactant In this example the procedures for preparing the clay slurry described in Example I were followed except that the clay component was first spray dried either with or without the addition of the 3M FC-95 potassium perfluoroalkyl sulfonates acid stable surfactant prior to spray drying. Each of the slurries was prepared to contain 0.25% TSPP and 0.25% sodium polyacrylate.

After the spray dried kaolin sample was prepared aliquot amounts were mixed with water to prepare slurries containing 65–70% solids. The slurry was subsequently incorporated into the spray drier feed tank containing the other catalyst components.

The attrition data for the catalysts prepared by this procedure along with the simulated aging data are compared with the data for the catalysts prepared without the surfactant in Table VIII. The simulated aging data was collected by aging comparable samples of treated and untreated spray dried kaolin for 5 days at a temperature of 180 degrees Fahrenheit. At the end of this time the aged spray samples were reslurried and used in preparation of catalysts.

It is apparent from the data presented in Table VIII that the catalysts prepared from the treated spray dried kaolin showed a marked improvement over the non-treated versions. The treated samples showed good stability under the accelerated aging test when compared to the non treated samples. This is apparent from a comparison of runs 120 and 132 with runs 119 and 131.

TABLE I

| Run No | 167 | 185 |
|---|---|---|
| NaY | 2636(25) | 2636(25) |
| Alumina | 526(10) | 526(10) |
| Silica sol | 11500(23) | 11500(23) |
| Clay | 3545(42) | 3545(42) |
| Sol pH | 2.93 | 2.97 |
| Sol Temp./C. | 33 | 31 |
| Feed pH | 3.27 | 3.29 |
| CAI | 9.83 | 9.03 |
| Att./Rate | 1.97 | 1.80 |

Notes
No additives were used in these runs.
Component inputs are shown as weight in grams and the number in ( ) is the percent material on a silica/alumina basis.

TABLE II

ADDITION OF SURFACTANT TO OTHER CATALYST COMPONENT SLURRIES

| RUN NO. | 181 | 182 | 183 | 184 |
|---|---|---|---|---|
| Na Y | 2636(25) | 2636(25) | 2636(25) | 2636(25) |
| Alumina | 526(10) | 526(10) | 526(10) | 526(10) |
| Silica sol | 11500(23) | 11500(23) | 11500(23) | 11500(23) |
| Clay | 3636(42) | 3636(42) | 3636(42) | 3636(42) |
| Sol pH | 3.00 | 3.01 | 3.00 | 3.00 |
| Sol Temp. C. | 32 | 31 | 33 | 34 |
| Feed pH | 3.29 | 3.27 | 3.20 | 3.27 |
| CAI | 0.79 | 1.90 | 1.85 | 2.29 |
| Att. Rate | 0.16 | 0.38 | 0.37 | 0.46 |
| Surf.,/g | 1.00 | 1.00 | 1.00 | 1.00 |
| Add. Point | Silica | Zeolite | Alumina | SD Feed |

Notes
Dupont Zonyl registered trademark covering fluorocarbon surfactant diluted/1 gram/100 ml of water
Surfactant was added and mixed into the individual component prior to addition of the component to the high shear mix tank.
Components inputs are shown by weight in grams and the number in ( ) is the percent material on a silica/alumina basis.

TABLE III

Surfactant 3M FC 95 potassium perfluoroalkyl sulfonate.

| Run No. | 93 | 94 | 96 |
|---|---|---|---|
| NaY | 1888(25) | 1888(25) | 1888(25) |
| Alumina | 526(10) | 526(10) | 526(10) |
| Silica sol | 11500(23) | 11500(23) | 11500(23) |
| Clay | 3545(42) | 3545(42) | 3545(42) |
| Sol pH | 3.02 | 2.97 | 3.10 |
| Sol. Temp. C. | 18 | 12 | 12 |
| Feed pH | 3.19 | 3.12 | 3.33 |
| Feed. Temp. C | 9 | 11 | 10 |
| CAI | 3.88 | 3.19 | 3.40 |
| Att. Rate | 0.78 | 0.64 | 0.70 |
| Surfactant, g. | 1.00 | 2.00 | 4.00 |

Notes
Surfactant added as a dry powder to the clay slurry on the basis of 1 gram per 2442 grams of as is clay.
Clay slurry made up using 0.5% TSPP
The Zeolite source had a lower moisture content therefore the weight used in each prep is less.
Component inputs are shown by weight in grams of as is component and the number in ( ) is the percent material on a silica/alumina basis.

TABLE IV

Preparation using 18% Binder

| Run No. | 150 | 163 | 164 | 165 |
|---|---|---|---|---|
| NaY | 2636(25) | 2136(20) | 1591(15) | 1045(10) |
| Silica sol | 9000(18) | 9000(18) | 9000(18) | 9000(18) |
| Alumina | 526(10) | 526(10) | 526(10) | 526(10) |
| Clay | 3955(47) | 4364(52) | 4818(57) | 5227(62) |
| Sol pH | 2.95 | 2.96 | 3.00 | 2.95 |
| Sol Temp. C. | 36 | 36 | 35 | 36 |
| Feed pH | 3.33 | 3.20 | 3.31 | 3.20 |
| CAI | 4.04 | 1.70 | 2.42 | 1.37 |
| Att. Rate | 0.81 | 0.34 | 0.49 | 0.27 |
| Surf., gm | 1.12 | 1.24 | 1.36 | 1.48 |

Notes
Dupont Zonyl a registered trademark covering fluorocarbon TBS Surfactant diluted on the basis of 1 gram/100 ml water and added to the clay slurry.
Surfactant loading is normalized to equal 1 gram per 2442 grams of as is clay.
Component inputs are shown by weight in grams and the number in ( ) is the percent material on a silica/alumina basis.

TABLE V

Preparation using 23% Binder

| Run No. | 170 | 171 | 180 |
|---|---|---|---|
| NaY | 2636(25) | 2636(25) | 2636(25) |
| Silica sol | 11500(23) | 11500(23) | 11500(23) |
| Alumina | 526(10) | 526(10) | 526(10) |
| Clay | 3545(42) | 3545(42) | 3545(42) |
| Sol pH | 3.01 | 2.97 | 3.00 |
| Sol Temp. C. | 34 | 33 | 31 |
| Feed pH | 3.26 | 3.31 | 3.23 |
| CAI | 2.44 | 1.32 | 1.30 |
| Att. Rate | 0.49 | 0.26 | 0.26 |

TABLE V-continued

| | Preparation using 23% Binder | | |
|---|---|---|---|
| Run No. | 170 | 171 | 180 |
| Surfactant, gm. | 1.00 | 2.00 | 4.00 |

Notes
Dupont Zonyl a registered trademark covering fluorocarbon TBS Surfactant diluted on the basis of 1 gram/100 ml water and added to the clay slurry.
Surfactant loading is normalized to equal 1 gram per 2442 grams of as is clay.
Component inputs are shown by weight in grams and the number in ( ) is the percent material on a silica/alumina basis.

TABLE VI

| | Addition of Surfactant to Catalyst Slurries | | |
|---|---|---|---|
| Run No. | 181 | 182 | 183 |
| NaY | 2636(25) | 2636(25) | 2636(25) |
| Silica sol | 11500(23) | 11500(23) | 11500(23) |
| Alumina | 526(10) | 526(10) | 526(10) |
| Clay | 3636(42) | 3636(42) | 3636(42) |
| Sol pH | 3.00 | 3.01 | 3.00 |
| Sol Temp. C. | 32 | 31 | 33 |
| Feed pH | 3.29 | 3.27 | 3.20 |
| Feed Temp. C. | 22 | 22 | 25 |
| CAI | 0.79 | 1.90 | 1.85 |
| Att Rate | 0.16 | 0.38 | 0.37 |
| Surfactant, gm. | 1.00 | 1.00 | 1.00 |
| Add. Point | Silica | Zeolite | Alumina |

Notes
Dupont Zonyl a registered trademark covering fluorocarbon TBS Surfactant diluted on the basis of 1 gram/100 ml of water.
Surfactant was added to and mixed into the individual components prior to adding the component to the high shear mix tank.
Component inputs on an as is basis are shown, but as weight in grams and the number in ( ) is the percent material on a silica/alumina basis.

TABLE VII

| | Addition of Surfactant to Catalyst Slurries | | |
|---|---|---|---|
| Run No. | 184 | 178 | 179 |
| NaY | 2636(25) | 2636(25) | 2636(25) |
| Silica | 11500(23) | 11500(23) | 11500(23) |
| Alumina | 526(10) | 526(10) | 526(10) |
| Clay | 3636(42) | 3636(42) | 3636(42) |
| Sol pH | 3.00 | 2.97 | 2.95 |
| Sol Temp. C. | 34 | 32 | 32 |
| Feed pH | 3.27 | 3.23 | 3.26 |
| Feed Temp. C. | 26 | 24 | 21 |
| CAI | 2.29 | 1.90 | 0.74 |
| Att Rate | 0.46 | 0.38 | 0.15 |
| Surfactant, gm. | 1.00 | 0.50 | 1.00 |
| Add. Point | S.D. Feed | | in all components |

Notes
Dupont Zonyl a registered trademark covering fluorocarbon Surfactant diluted on the basis of 1 gram/100 ml of water.
Surfactant was added to and mixed into individual components prior to adding the component to the high shear mix tank.
Component inputs are shown by weight in grams on an as is basis and the number in ( ) is the percent material on a silica/alumina basis.

TABLE VIII

ATTRITION AND AGING DATA FOR CATALYST PREPARED FROM KAOLIN TREATED WITH 3M FC-95 POTASSIUM PERFLUOROALKYL SURFACTANTS BEFORE SPRAY DRYING

| Run No. | Type | Age | CAI | Rate |
|---|---|---|---|---|
| 119 | *AF-STD-P | 0 | 8.32 | 1.08 |
| 120 | **AF-STD-P, FC-95 potassium perfluoroalkyl surfactants | 0 | 3.16 | 0.63 |
| 131 | *AF-STD-P | 5 days*** | 9.70 | 1.93 |
| 132 | AF-STD-P, FC-95 potassium perfluoroalkyl surfactants | 5 days* | 3.84 | 0.77 |

AF-STD-P Standard Catalyst Preparation (see Table I, runs 167 and 185 using air float clay (AF)
*FC-95 potassium perfluoroalkyl surfactants added - 1 gram per 2442 grams of air float clay (AF)
**Aging at 180 degrees F.

Obviously many modifications and variations of the invention may be made without departing from the essence and scope thereof. Only such limitations should be applied as are indicated in the appended claims.

What is claimed is:

1. A process for improving the physical and catalytic properties of a sol based fluid cracking catalyst which comprises the steps of;
   (a) preparing an acid aluminum sulfate silica sol binder component,
   (b) preparing a clay slurry component,
   (c) combining components (a) and (b),
   (d) preparing a zeolite slurry component,
   (e) preparing an alumina slurry component,
   (f) adding an effective amount of an acid stable anionic fluorocarbon surfactant to at least one of the components,
   (g) combining the components and spray drying,
   (h) washing, exchanging, drying, calcining and recovering the catalyst product.

2. The process according to claim 1 wherein the components are combined, and after the combination, acid stable surfactant is added to the spray drier feed.

3. The process according to claim 1 wherein the acid aluminum sulfate, silica sol binder slurry is prepared by dissolving about 0.40 to 0.46 kilograms of aluminum sulfate in about 1.70 to 1.80 kilograms of water, adding about 0.28 to 0.29 kilograms of concentrated sulfuric acid, cooling and mixing with a sufficient quantity of sodium silicate, containing 12.4 weight percent silica, to adjust the final pH of the slurry to about 2.80 to 3.05.

4. The process according to claim 1 wherein the clay slurry component is prepared by adding a sufficient quantity of kaolin clay to water to prepare a slurry containing about 65 to 75 percent preferably about 70 percent solids.

5. The process according to claim 1 wherein the zeolite slurry is prepared by adding a sufficient quantity of faujasite to water to prepare a slurry containing about 20 to 25 percent preferably about 20% solids and adjusting the pH to about 4.5 to 4.8.

6. The process according to claim 1 wherein the alumina slurry is prepared by adding a sufficient quantity of alumina to water to prepare a slurry containing about 20 to 25 percent preferably about 22 percent solids.

7. The process according to claim 1 wherein a sufficient quantity of the surfactant is added to each of the other components to a level of 0.50 to 10 pounds preferably about 1.00 pound per ton of catalyst.

8. The process according to claim 1 wherein the spray dried catalyst is slurried, filtered, rinsed with an ammonium salt solution washed, dried, washed, exchanged with a rare earth salt solution, washed, dried and calcined, slurried, filtered, rinsed with an ammonium salt solution, washed and dried.

9. The process according to claim 1 wherein the spray dried catalyst is slurried, filtered, rinsed with an ammonium salt solution, washed, dried and calcined, washed and dried.

10. The process according to claim 1 wherein the calcination is carried out at a temperature of 1000 to 1500 degrees F.

11. A process for improving the physical and catalytic properties of a fluid cracking catalyst by adding an effective amount of an acid stable anionic fluorocarbon surfactant to the catalyst components.

12. A process for improving the aging characteristics of koalin type clay which comprises adding an effective amount of an acid stable anionic fluorocarbon surfactant to the clay slurry.

* * * * *